United States Patent
Baade et al.

(10) Patent No.: US 9,294,459 B2
(45) Date of Patent: Mar. 22, 2016

(54) METHOD FOR A MOTOR VEHICLE

(71) Applicant: Volkswagen Aktiengesellschaft, Wolfsburg (DE)

(72) Inventors: Marco Baade, Bad Muender (DE); Gunnar Koeller, Bad Muender (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 11 days.

(21) Appl. No.: 14/099,324

(22) Filed: Dec. 6, 2013

(65) Prior Publication Data

US 2014/0165159 A1 Jun. 12, 2014

(30) Foreign Application Priority Data

Dec. 6, 2012 (DE) .................. 10 2012 024 010

(51) Int. Cl.
| | |
|---|---|
| *G06F 21/00* | (2013.01) |
| *H04L 29/06* | (2006.01) |
| *H04W 12/06* | (2009.01) |
| *H04W 12/08* | (2009.01) |
| *H04L 29/08* | (2006.01) |
| *H04W 4/04* | (2009.01) |
| *G07C 9/00* | (2006.01) |
| *G05D 3/00* | (2006.01) |

(52) U.S. Cl.
CPC .............. *H04L 63/08* (2013.01); *H04L 63/102* (2013.01); *H04L 67/12* (2013.01); *H04W 4/046* (2013.01); *H04W 12/06* (2013.01); *H04W 12/08* (2013.01)

(58) Field of Classification Search
CPC ....... H04L 63/08; H04L 63/102; H04L 67/12; H04W 12/06; H04W 12/08
See application file for complete search history.

(56) References Cited

U.S. PATENT DOCUMENTS

| | | | |
|---|---|---|---|
| 6,487,717 B1 | 11/2002 | Brunemann et al. | |
| 8,050,817 B2 | 11/2011 | Moinzadeh et al. | |
| 8,055,403 B2 | 11/2011 | Lowrey et al. | |
| 8,060,873 B2 | 11/2011 | Ceskutti et al. | |
| 2011/0093846 A1* | 4/2011 | Moinzadeh et al. | 717/178 |
| 2011/0258333 A1 | 10/2011 | Pomerantz et al. | |
| 2012/0232961 A1 | 9/2012 | Wellman et al. | |
| 2012/0316699 A1* | 12/2012 | Filev et al. | 701/1 |
| 2013/0124009 A1* | 5/2013 | Esler | 701/2 |

FOREIGN PATENT DOCUMENTS

| | | | | |
|---|---|---|---|---|
| DE | 100 01 130 B4 | 9/2004 | | |
| DE | 103 31 874 A1 | 3/2005 | | |
| DE | 10 2009 037 234 A1 | 2/2011 | | |
| EP | 1191486 A1 * | 3/2002 | ......... | B60R 25/2081 |

OTHER PUBLICATIONS

Apfelbeck, J.; "UMTS mobility management"; Mobile and Personal Communications, 1993., Seventh IEE European Conference on Year: Dec. 1993; pp. 173-204.*

* cited by examiner

*Primary Examiner* — Kambiz Zand
*Assistant Examiner* — Courtney Fields
(74) *Attorney, Agent, or Firm* — Muncy, Geissler, Olds & Lowe, P.C.

(57) ABSTRACT

A method for a motor vehicle in which a communication connection between the vehicle and a server outside the vehicle is provided. In addition, user authentication information for a user of the vehicle is transmitted to the server, and an application is executed on the server as a function of the user authentication information. Output information that is generated by the server is transmitted to the vehicle from the application.

20 Claims, 2 Drawing Sheets

METHOD FOR A MOTOR VEHICLE

This nonprovisional application claims priority under 35 U.S.C. §119(a) to German Patent Application No. DE 10 2012 024 010.4, which was filed in Germany on Dec. 6, 2012, and which is herein incorporated by reference.

BACKGROUND OF THE INVENTION

1. Field of the Invention

The present invention relates to a method for a motor vehicle, in particular a method in which information is produced for the vehicle by an application that is being executed on a server. The present invention also relates to a device and a server that carry out the method.

2. Description of the Background Art

Modern vehicles, such as passenger cars or trucks, for example, offer a multitude of complex adjustment options and functions, which are sometimes dependent on the software loaded in the vehicle or the unlocking of the software. When a driver changes vehicles, he undertakes these configurations anew himself each time or must have the functions he has purchased unlocked by a workshop again. If a vehicle is used by multiple people, such configurations and functions of the vehicle generally are not associated with the individual, but instead with the vehicle, and therefore must either be set anew by each user or are equally available to all users.

In this context, centralized management of motor vehicle software applications and services is known from U.S. Pat. No. 8,050,817 B2. For example, a network device can store a mapping of application operation modes to vehicle conditions, such as a first condition of the vehicle in which it is not moving, and a second condition of the vehicle in which it is moving. The network device receives a wirelessly transmitted request for a specific application to support an interface of the vehicle. The network device compares an application identifier, which is specified by the request, to the mapping. The network device identifies a portion of the vehicle interface according to the comparison and signals control software on the vehicle to allow the specific application access to only the identified portion of the vehicle interface. The application can reside on a mobile device and utilize the vehicle interface as an extended interface, or the application can reside on the vehicle. In consequence, vehicles can be manufactured without applications installed on the vehicle, and the applications can instead be downloaded to the vehicles when the drivers are present in the vehicles. The types of applications that are downloaded to the vehicles are managed through preferences that are defined in a network server and provided by the drivers.

DE 10 2009 037234 A1 relates to a method for at least unidirectional transmission of data between a data processing device located outside of a vehicle and one vehicle at a time from a fleet of motor vehicles. In order to enable an exchange of data between a personal computer and any desired motor vehicles from a fleet of motor vehicles, a central server is utilized upon which user accounts are maintained, and the personal computer can access these user accounts. A vehicle identification number is stored in the user account. Then a portable device is coupled with a first motor vehicle and functions in essence as identification for the user. A password may be requested from the user a single time. The first connection has the result that the portable device is defined as identification even when it is later connected to other motor vehicles. Connecting the portable device to any desired motor vehicle then has the effect of allowing an exchange of data between the server and the motor vehicle in question.

DE 10001130 B4, which corresponds to U.S. Pat. No. 6,487,717, concerns a method for modifying information that is used by a machine controller of a vehicle for a machine remote from a central location and that includes data or application software used by the machine controller to control operation of the machine. In this method, the World Wide Web is accessed from a central location and modification information is stored in digital intermediate file storage. The file storage is located remotely from both the central location and the remote machine. The remote machine accesses the World Wide Web at a point in time that is independent of the access by the central location. The remote machine downloads the modification information from the file storage via the World Wide Web and modifies information that is used by the machine controller in accordance with the modification information. In this way, either specific data can be downloaded to modify the performance of the controlled machine, or entirely new or modified application software can be downloaded directly to the machine controller.

DE 10331874A1, which corresponds to U.S. Pat. No. 8,060,873, concerns a method for remote programming of a program-controlled device. In the method, program data are remotely transmitted from a control point to an interface and are temporarily stored in a buffer memory there. Subsequently, authorization is transmitted from the control point to the interface and from there to the device. The device verifies the authorization, and in the event of a positive result retrieves the program data from the buffer memory.

U.S. Pat. No. 8,055,403 B2 concerns a vehicle telematics system with a controller in connection with a diagnostic system configured to receive diagnostic information from a vehicle. The telematics device also includes a position-locating system for determining location information of the vehicle, a wireless transmitter/receiver device configured to transmit information through a wireless network to and from at least one website accessible over the Internet, and a communication interface that has a short range wireless interface link. The telematics device can be configured as an access device that has the position-locating system. The access device can be a smartphone or similar device that transmits diagnostic information and other information to and from the vehicle over the short range wireless link. The access device performs various telematics device functions. It uses a long range wireless interface to transmit diagnostic data to a central computer.

SUMMARY OF THE INVENTION

It is therefore an object of the present invention to provide a driver with a personalized configuration and functionality in a vehicle that the driver is currently using.

According to an embodiment of the present invention, a method for a motor vehicle is provided in which a communication connection between the vehicle and a server outside the vehicle is provided, and user authentication information for a user of the vehicle is transmitted to the server. The user authentication information comprises information for unique identification of the user. In addition, an application is executed on the server as a function of the user authentication information, and output information that is generated by the application is transmitted to the vehicle. As a result, individual-specific and situation-dependent configuration of the vehicle and its functionality is possible in multi-user operation. The vehicle configuration and vehicle functionality is not part of the vehicle itself, but rather part of a functionality on a server. The vehicle can, for instance, be designed in terms of hardware such that certain user-specific configurations, software features, and software functions can be activated, deactivated, and reloaded. By means of the user authentication information, the user can take these configurations and functionalities along to any desired motor vehicles.

The communication connection can comprise, e.g., a telecommunications connection such as UMTS or GSM, for example, so that direct communication between the vehicle and the server is possible. Alternatively, the communication connection can comprise a communication connection between the vehicle and a mobile terminal of the user as well as a communication connection between the mobile terminal and the server. The communication connection between the vehicle and the mobile terminal can comprise a WLAN, Bluetooth, or NFC connection, for example. The communication between the mobile terminal and the server can again be a telecommunications connection. As a result, a communication means that is present in any case between the mobile terminal and the server can be used, so that the communication between the vehicle and the server can be implemented in an economical manner via the mobile terminal. The server can comprise one or more servers in a server landscape, a so-called cloud. The server or the cloud can be operated by a vehicle manufacturer, for example. The application that is executed on the server can include, for example, an assistance system of the vehicle, such as a navigation system, a parking assist system, a parking spot locator program, or a speed controller that takes into account a maximum permissible speed for a section of road or a driver. The output information that is generated by the application can include, for example, information for an engine controller, a chassis tuning system, or output from the navigation system for an output unit, a so-called head unit, of the vehicle.

According to an embodiment, vehicle identification information, such as a chassis number or what is known as a VIN (Vehicle Identification Number), is transmitted from the vehicle to the server in the method. The vehicle identification information includes information to uniquely identify the vehicle. The application is executed on the server as a function of the vehicle identification information as well. Different vehicles may have different equipment and technical features. In order to accommodate these differences, the application can respond accordingly as a function of the vehicle identification information. Moreover, different applications can be executed on the server as a function of the vehicle identification information in order to carry out similar functionalities that are associated with the user through the user authentication information.

According to an embodiment of the method, multiple user profiles are provided on the server and one of the multiple user profiles is selected as a function of the user authentication information. A user profile of the multiple user profiles includes an authorization to use the application on the server. The application is executed on the server as a function of the selected user profile. The user profile can include user-specific configuration data for multiple different vehicles, for example. As a function of the vehicle identification information, the relevant configuration data for the vehicle are selected from the user profile and are transmitted to the vehicle. The configuration data may include, for example, a seat adjustment, a station setting for a car radio, a chassis tuning, a lighting adjustment, an engine setting such as a maximum power or maximum speed, an air conditioner setting, or a setting of a maximum speed for the vehicle. The configuration data can additionally be used by the application on the server to adjust settings in the vehicle. For example, the configuration data can include a seat adjustment setting for a user in a first vehicle, and on this basis the application can derive a seat adjustment for a second vehicle that the user is using for the first time and transmit it to the second vehicle to adjust the seat. Furthermore, a chassis tuning of a vehicle that the user has not yet used can be set to be comparable to chassis settings of vehicles that the user has used and adjusted before, for example.

According to an embodiment of the method, the operating information of the vehicle is acquired in the vehicle and transmitted to the server. The application in the server determines the output information as a function of the operating information. The operating information can include, for example, an inside or outside temperature of the vehicle, a brightness in an environment of the vehicle, a distance to a vehicle driving in front, a speed, a position, or a steering angle of the vehicle, as well as information as to whether there is precipitation, such as rain or snow, in the vehicle's environment. The operating information can be used by the application for such purposes as to adjust the configuration of the vehicle, for instance engine or chassis tuning as a function of a speed of the vehicle or a weather situation in the vehicle's environment. In addition, in the method, environmental information that is acquired from devices in an environment of the vehicle or is determined for the environment of the vehicle can be ascertained in the server. The application can additionally determine the output information as a function of the environmental information. The environmental information can include, for instance, weather conditions on a section of road where the vehicle is located, or a status of other vehicles in the vehicle's environment. The status of the other vehicles, as for example the speed of the other vehicles or whether the other vehicles have switched their lights on or off or have switched their windshield wipers on or off, can be used to configure this vehicle. Moreover, the environmental information can include traffic information, as for example reports of traffic jams, and map information. For example, the map information can indicate a type of street on which the vehicle is located, for example whether it is a city street, a country road, or an interstate highway. On the basis of this environmental information, a chassis of the vehicle or a maximum speed of the vehicle can be configured, for example. In addition, the application can adjust user-specific configurations, such as a dimming of mirrors or an air-conditioner setting, and transmit them to the vehicle.

According to an embodiment, a user profile that includes user-specific configuration data for the vehicle or an authorization to use the application on the server is provided on a mobile terminal of the user. The mobile terminal can include a cell phone, for example, in particular a so-called smartphone. Data from the user profile are transmitted from the mobile terminal to the vehicle and/or server, and the vehicle is adjusted as a function of the user-specific configuration data or an application is executed on the server as a function of the user profile. As a result of the fact that the user profile is stored on the user's mobile terminal, applications that are unlocked for the user and user-specific configuration data can be activated automatically, by the means that the user carries the mobile terminal along when using the vehicle. Moreover, configuration data or authorizations to use applications can be changed using the mobile terminal. For example, the user can also purchase additional applications, or have them unlocked, outside of the vehicle and independently of the vehicle, and they can then be used automatically the next time he uses the vehicle. Moreover, by means of a configuration of the user profile, it is also possible to configure the vehicle from outside the vehicle using the mobile terminal.

According to an embodiment of the present invention, a device for a vehicle is provided that includes an interface for providing a communication connection between the vehicle and a server outside the vehicle, and a processing unit. The processing unit transmits user authentication information from the vehicle to the server. The user authentication information includes information for the unique identification of the user. The processing unit is designed to receive output information from an application that runs on the server. The application on the server, which generates the output information, is executed as a function of the user authentication information.

According to an embodiment of the present invention, a server is provided that includes an interface and a processing unit. The interface serves to provide a communication connection between the server and a vehicle. The processing unit is designed to receive user authentication information for a user of the vehicle and to execute an application on the server as a function of the user authentication information. The user authentication information includes information for the unique identification of the user. The application generates output information, which is transmitted to the vehicle from the application.

The device and the server can be designed to carry out the above-described method, and therefore encompass the above-described advantages.

Also, according to an embodiment of the present invention a vehicle is provided that includes the above-described device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
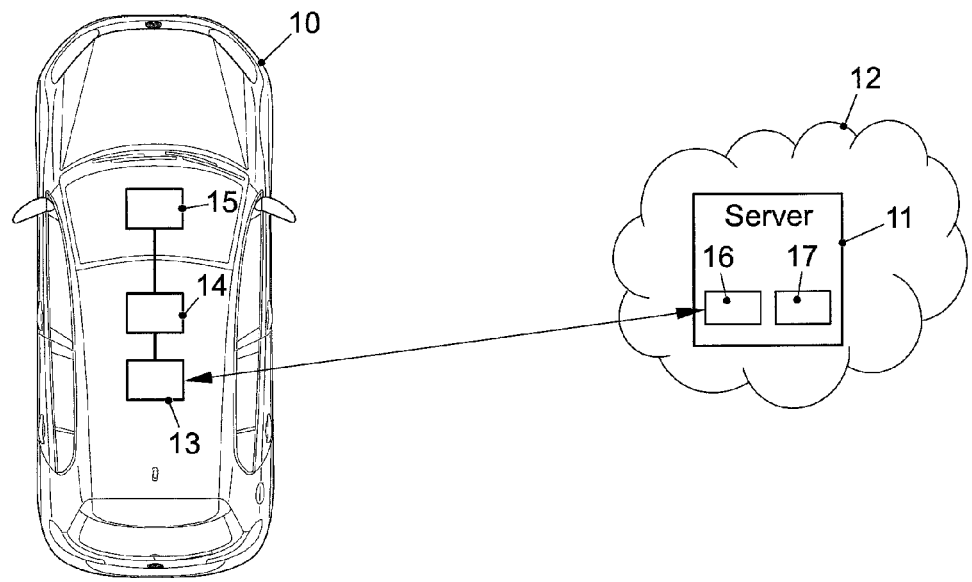
FIG. 1 shows a vehicle and a server according to an embodiment of the present invention.

FIG. 1 shows a vehicle 10 and a server 11. The server 11 can be part of a server landscape in a so-called cloud 12. The vehicle 10 includes an interface 13 for providing a communication connection between the vehicle 10 and the server 11. The vehicle 10 also includes a processing unit 14 and a display unit 15, which can include, for example, a so-called head unit of a vehicle infotainment system. The server 11 includes an interface 16 for providing a communication connection between the server 11 and the vehicle 10, and a processing unit 17. The communication connection between the vehicle 10 and the server 11 can take place through a telecommunications connection, for example, such as UMTS or GSM.

Figure 3:
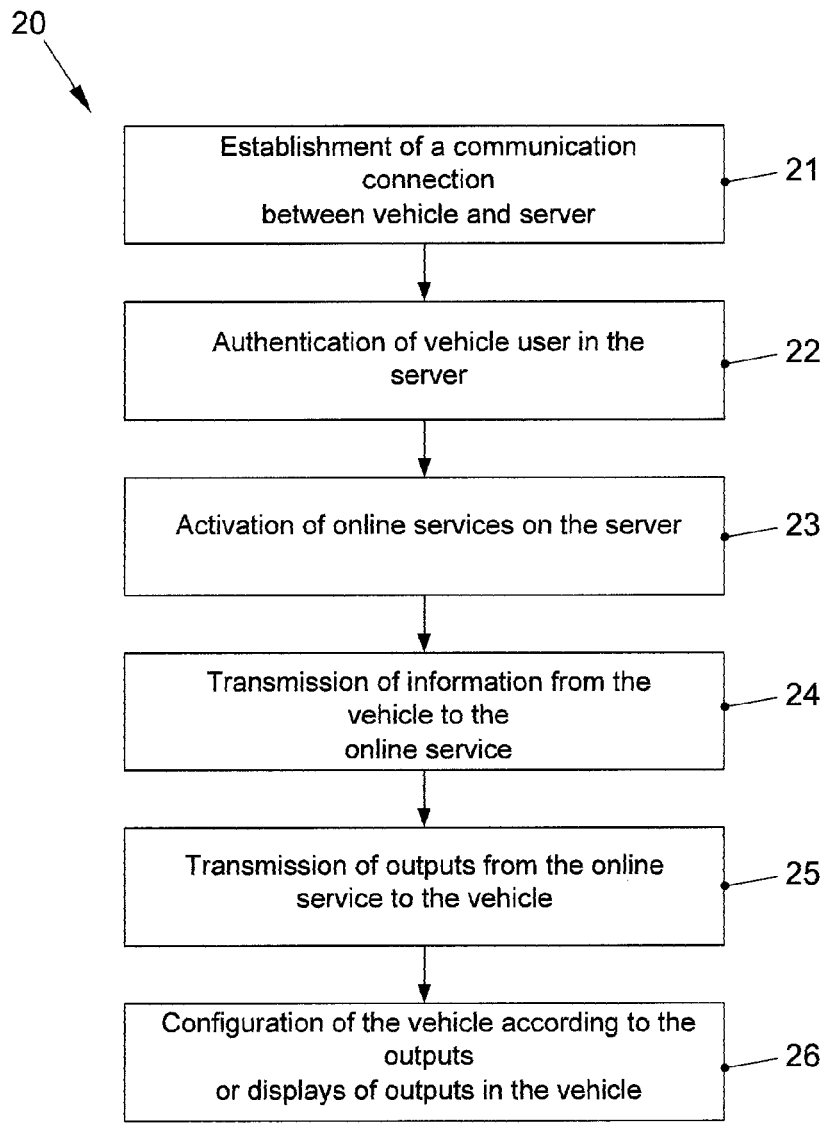
FIG. 3 shows steps of a method according to an embodiment of the present invention.

Operation of the vehicle 10 in conjunction with the server 11 shall be described below in connection with the method 20 shown in FIG. 3. In step 21, a communication connection is established between the vehicle 10 and the server 11. In step 22, a user of the vehicle 10 authenticates himself to the server 11, for example by entering a secret, such as a user ID and a password, through the head unit 15 of the vehicle 10. Based on this user authentication information, which is transmitted from the vehicle 10 to the server 11, online services are activated in the server in step 23. The online services can include, for example, applications or programs that run on the server. In addition, the online services can include a user profile with which an application on the server 11 carries out configurations on the vehicle 10. In addition, the online services can process information from the vehicle and provide appropriate outputs for the vehicle. To this end, information is transmitted from the vehicle to the online services in step 24. This information can include, for instance, a location of the vehicle, a speed of the vehicle, a current seat adjustment of the vehicle, a steering angle of the vehicle, an inside temperature or outside temperature of the vehicle, etc. This information is processed by the online services or applications in the server, and suitable outputs are produced, which are transmitted to the vehicle in step 25. The outputs are used in the vehicle 10 in step 26, for example to generate outputs at the head unit 15 or to configure the vehicle in accordance with the outputs.

Figure 2:
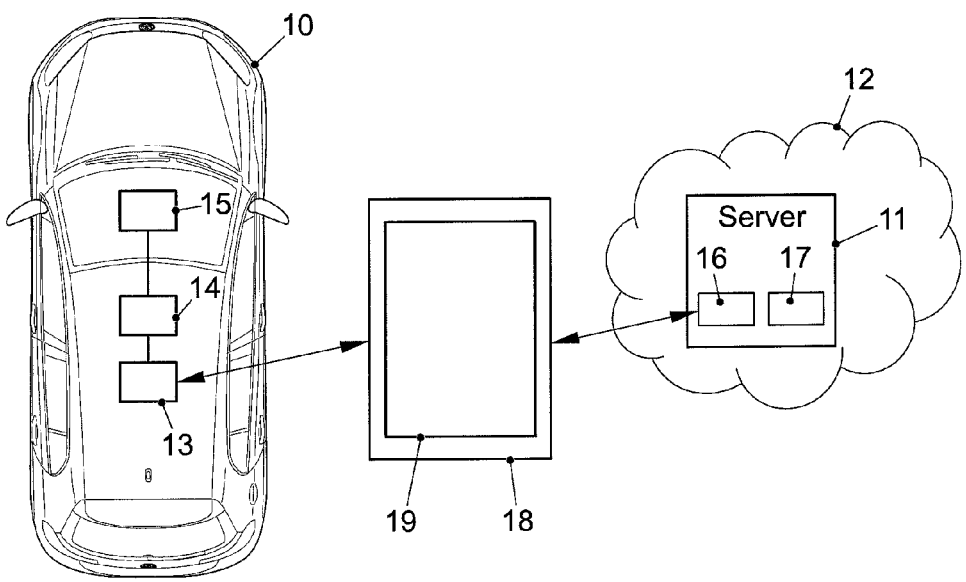
FIG. 2 schematically shows a vehicle, a mobile terminal, and a server according to an embodiment of the present invention.

FIG. 2 shows a mobile terminal 18, which is connected into the communication connection between the vehicle 10 and the server 11. The communication between the mobile terminal 18 and the vehicle 10 can comprise, for example, near field communication (NFC) or, for example, a Bluetooth connection. The communication connection between the mobile terminal 18 and the server 12 can be a telecommunications connection conforming to the UMTS or GSM standards, for example. The mobile terminal 18 can include a user interface 19, for example a touchscreen. In particular, the mobile terminal can be a cell phone or a so-called smartphone. Since the cell phone 18 usually is a terminal associated with the user, the user authentication information of the user can be stored on the mobile terminal 18. When a user enters the vehicle 10 together with the mobile terminal 18, the near field communication between the vehicle 10 or the mobile terminal 18 can be established automatically, whereupon the mobile terminal 18 transmits the user authentication information to the server 11 and, as described above in connection with FIGS. 1 and 3, online services are unlocked on the server 23. The communication between the server 11 and the vehicle 10 take place over the mobile terminal 18 in this case.

With the above-described system comprising the vehicle 10, the server 11, and if applicable the mobile device 18, individualization of the vehicle with respect to one or more drivers is possible. A family car that is used by multiple family members can be adjusted to the relevant circumstances as a function of the user authentication information. For example, play lists of an infotainment system, an illumination type of an instrument cluster, air conditioner settings, a driver seat position, lighting settings, chassis tunings, parameters of a navigation system, preferred routes or points of interest for navigation, contacts for a car telephone, etc., can be set in a user-specific manner. Furthermore, individual-specific unlocking of applications, so-called software features, is possible. For example, one user may have purchased a specific application that has, however, not been purchased by other drivers of the vehicle. This software feature can include a sport mode of the vehicle, for example. This feature should only be usable by a limited set of vehicle users, however. By means of the user authentication information and a user profile associated with the user authentication information, an unlocking of this nature can be carried out in an individual-specific manner. Using the mobile terminal 18, it is additionally possible to adjust settings independently of the vehicle for a next use of the vehicle. The individual-specific user profile thus created can be stored in the mobile terminal 18 or on the server 11, as desired. When a driver gets into a vehicle that is activated for him, the entire vehicle thus adjusts to his requirements. Moreover, temporary activations for specific applications are possible, such as a navigation function, for example. Moreover, a navigation application, for example, can be executed on the server 11 as a function of the user authentication information, regardless of which vehicle the user is in, as long as the vehicle has appropriate output means in terms of hardware to output the navigation instructions from the navigation application. The information of the personal profile can be adapted to any desired vehicles by means of a suitable application on the server within the scope of their equipment and options. If no communication connection exists between the vehicle 10 and the server 11, the vehicle 10 and its functions operate in accordance with a standard configuration that was set up during initial startup of the vehicle and is always available or retrievable.

In the user profile that is associated with or includes the user authentication information, configurations can also be stored in a vehicle-specific manner. Identification of a certain vehicle can take place through a chassis number, for example, or through another vehicle-specific identifier such as a Vehicle Identification Number (VIN). When a user logs into a vehicle for which vehicle-specific and user-specific configurations already exist on the server 11, these configurations are automatically transferred to the vehicle 10. A user profile can store multiple vehicle-specific and user-specific configurations, so that for each vehicle that the user has used once there exists a corresponding vehicle-specific and user-specific profile, which is used automatically when the vehicle is used again. Furthermore, the user can contact the server 11 through the mobile terminal 18 or a PC in order to set configurations for the vehicle 10 or to have new or additional applications unlocked. Such profile changes are stored on the server 11, so that the updated profile is now available in each vehicle at log-in.

Below, various user scenarios are described that are made possible with the vehicle 10, the server 11, and, as the case may be, the mobile terminal 18.

In a first user scenario, the user has loaded his user profile onto his mobile terminal 18 from the server 11 or from the cloud 12. The user gets into the vehicle 10. With the aid of the server 11, the vehicle 10 detects the authorization for the user through the user profile in the mobile terminal 18. The settings, software functions, and online services defined in the user profile are activated in the vehicle. When the user leaves the vehicle, the vehicle adopts the standard settings again. When two people get into the vehicle 10 who each have a mobile terminal 18 and in whose profiles the vehicle 10 is authorized, a query can be made as to who is supposed to be the driver, for example through the mobile terminals 18 or the head unit 15 of the vehicle. Alternatively, a prioritization can be stored in the profiles, for example that one of the two people is always the driver when these two particular people are present.

In another user scenario, a user who has previously authenticated himself to the server 11 is driving the vehicle 10 through a storm. The storm situation is detected on the basis of corresponding sensor readings of the vehicle and a comparison with weather data available in the cloud 12, for example. An application on the server offers the driver the option of accepting a storm mode available for the vehicle 10. The driver accepts the option, causing vehicle settings in accordance with the storm mode to be made and at the same time for this configuration to be stored in the user's profile.

In another user scenario, a user gets into the vehicle 10 with his mobile terminal 18 in order to drive to work. User authentication takes place through the mobile terminal 18, and the vehicle retrieves the driver's profile and the associated driving modes from the cloud 12 through the mobile terminal 18. The mode "drive to work" is automatically activated since this is scheduled for the trip at this time by calendar organization or by activation the day before. All stored settings, software functions, and online services of the mode are loaded from the cloud 12. In the "drive to work" profile, the user has configured automatic activation of the seat heating to a specific level for the wintertime. Accordingly, the seat heating is activated. The distance to work is known based on the "drive to work" mode. The engine of the vehicle 10 is set to reduced power, since the route follows a winding country road for the first 20 kilometers. In addition, a chassis tuning appropriate for this stretch is set. Furthermore, an instrument cluster, a seat position, and an air conditioner of the vehicle 10 can be adjusted per the user profile. Since the driver likes to listen to news and sports reports on the way to work in the morning, and this is defined in the profile, news stations and sports stations are displayed in the top slots of a station list of a vehicle radio. A news station is activated, and alternatively or in addition, news tickers or sports tickers from online services can be read aloud. The driver has stored in his profile that the fastest route to work goes at least part way on an interstate highway, under the condition that there is no traffic jam there. A navigation application, which for example is available as an online service on the server 11, has already been activated with the workplace as the destination, with the interstate highway being preferred in the route planning and taking into account traffic reports, which are available in the cloud 12. Once the stretch along the country road has been traveled, the driver then drives the vehicle onto the interstate highway. The engine is now configured so that it once again makes full power available. The driver has stored in the profile that the seat heater is to be deactivated after 50 kilometers or 20 minutes of driving time. Accordingly, the seat heater automatically switches off. The vehicle is, for example, an electric vehicle and reports a low charge condition for the driving battery, so that the remaining range would be insufficient for the return trip. Furthermore, the vehicle reports the locations of available charging stations based on information from the server 11 or the cloud 12. Moreover, after reconciling the driver's appointment calendar and the navigation destination "work," the vehicle displays a suggestion to reserve a free charging station at the destination and to adjust the destination accordingly. The driver accepts the suggestion, and the navigation application guides him directly to the charging station reserved for him. An intelligent charging algorithm is used to ensure that the vehicle is fully charged after work. The driver reaches his destination and leaves the vehicle. Finally, the driver has the status of the vehicle displayed. The vehicle reports the desired diagnostic information to the mobile terminal 18 and reports, for example, that the vehicle is fine in technical terms and is now switching to the charging state. If fault states are detected in the vehicle, a suggestion could be made to send the fault data to a service facility through the cloud 12 and to arrange a service appointment online or to request a service technician.

In another user scenario, the vehicle 10 is used by another driver who is not the owner of the vehicle 10, for example. This is stored in the driver's profile. Also stored in the profile is the fact that this driver is a novice driver, and consequently driver assistance systems are always and unchangeably active for this driver, an engine power is continuously reduced, and a maximum volume of the infotainment system of the vehicle is reduced by half. The driver gets in the car and authenticates himself to the server 11 using his mobile terminal 18. The driver activates the "recreation" mode, and in the vehicle, all settings, software functions, and online services stored for the "recreation" mode are loaded from the cloud 11 and set, for example a preferred play list for an infotainment system of the vehicle. The driver is notified through the head unit 15 that a new application is available that displays interesting clothing stores in the vicinity on a map with corresponding comments from other users. The driver subscribes to this service for a limited period of time, and thus associates the new functionality thus attained with the "recreation" mode. The corresponding application is started and interesting clothing stores are displayed on a map display on the head unit 15. The driver selects one of the clothing stores as a destination for the navigation system, and the navigation system starts up. Since the driver has selected the "recreation" mode and the online service "show your location" is activated for this mode, a predefined group of users, for example a group of the driver's friends, is informed through a social network as to where the driver is going. During the trip, the driver exceeds the permissible maximum speed despite repeated audible and visual warnings from the vehicle, and is detected by a speed measuring device. Through the cloud 12, the vehicle notifies the vehicle owner of the violation of the traffic laws. In addition, a suggestion is made to the owner to automatically limit the speed of the vehicle in such a way that speed limits are automatically observed. The owner receives this suggestion through his mobile terminal 18 and accepts. This setting is permanently stored in the driver's profile, and the vehicle is configured accordingly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for a motor vehicle, the method comprising:
providing a communication connection between the vehicle and a server that is outside of the vehicle;
transmitting user authentication information from a user of the vehicle to the server, the user authentication information comprising information for a unique identification of the user;
retrieving a user profile associated with the user authentication information stored in the server;
acquiring driving environment information of the vehicle in the server;
executing an application on the server based on the user profile and the acquired driving environment information;
transmitting output information of the application from the server to the vehicle; and
automatically changing a driving mode of the vehicle based on the output information received from the server.

2. The method according to claim 1, further comprising:
providing multiple user profiles on the server, wherein a user profile from the multiple user profiles includes an authorization to use the application on the server; and
selecting the user profile from the multiple user profiles as a function of the user authentication information,
wherein the execution of the application includes an execution of the application on the server as a function of the selected user profile.

3. The method according to claim 1, further comprising:
transmitting vehicle identification information from the vehicle to the server, the vehicle identification information including information for unique identification of the vehicle,
wherein the execution of the application includes an execution of the application on the server as a function of the vehicle identification information.

4. The method according to claim 2, wherein the user profile includes user-specific configuration data for multiple vehicles, and wherein the method further comprises:
selecting configuration data for the vehicle from the user profile as a function of the vehicle identification information; and
transmitting the selected configuration data to the vehicle.

5. The method according to claim 1, further comprising:
acquiring operating information of the vehicle in the vehicle and transmitting the operating information to the server and/or acquiring environmental information in the server that is acquired from devices in an environment of the vehicle or is determined for the environment of the vehicle; and
determining the output information by the application as a function of the operating information and/or environmental information.

6. The method according to claim 1, wherein the provision of the communication connection between the vehicle and the server includes establishment of a communication connection between the vehicle and a mobile terminal of the user of the vehicle and establishment of a communication connection between the mobile terminal and the server.

7. The method according to claim 1, further comprising:
providing, on a mobile terminal of the user of the vehicle, a user profile that includes user-specific configuration data for the vehicle and/or an authorization to use the application on the server;
transmitting data in the user profile to the vehicle; and
adjusting the vehicle as a function of the user-specific configuration data and/or execution of the application on the server as a function of the user profile.

8. A device for a vehicle comprising:
an interface configured to provide a communication connection between the vehicle and a server provided outside of the vehicle; and
a processing unit configured to transmit user authentication information from the vehicle to the server, the user authentication information comprises information for unique identification of the user, the processing unit also configured to receive output information from an application, the application being executed on the server based on the user profile associated with the user authentication information and retrieved by the server and based on driving environment information of the vehicle acquired in the server, the processing unit further configured to automatically change a driving mode of the vehicle based on the output information.

9. A server comprising:
an interface configured to provide a communication connection between the server and a vehicle; and
a processing unit configured to receive user authentication information for a user of the vehicle from the vehicle, the user authentication information comprising information for unique identification of the user, the processing unit also configured to retrieve a user profile associated with the user authentication information, to acquire driving environment information of the vehicle, to execute an application on the server based on the user profile and the acquired driving environment information, and to transmit output information from the application to the vehicle, the output information including a driving mode change request for automatically changing a driving mode of the vehicle.

10. The device according to claim 8, wherein the device or the server is configured to perform a method comprising:
  establishing the communication connection between the vehicle and the server that is outside of the vehicle;
  transmitting the user authentication information from the user of the vehicle to the server, the user authentication information comprising information for the unique identification of the user;
  retrieving a user data associated with the user authentication information stored in the server;
  acquiring driving environment information of the vehicle in the server;
  executing an application on the server based on the user profile and the acquired driving environment information;
  transmitting output information of the application from the server to the vehicle; and
  changing a driving mode of the vehicle based on the output information received from the server.

11. A method for a motor vehicle, the method comprising:
  providing a communication connection between the vehicle and a server that is outside of the vehicle;
  transmitting user authentication information from a user of the vehicle to the server, the user authentication information comprising information for a unique identification of the user;
  retrieving a user profile associated with the user authentication information stored in the server;
  acquiring driving environment information of the vehicle in the server;
  executing an application on the server based on the user profile and the acquired driving environment information;
  transmitting output information of the application from the server to the vehicle; and
  changing a driving mode of the vehicle based on the output information received from the server,
  wherein the authentication information includes user identification information and a password.

12. The method according to claim 1, wherein the user profile includes vehicle configuration data.

13. The method according to claim 12, wherein the vehicle configuration data includes engine setting configuration data and/or chassis tuning configuration data.

14. The method according to claim 1, wherein the driving environment information includes a driving location of the vehicle, weather of the driving location and/or a time of day.

15. A method for a motor vehicle, the method comprising:
  providing a communication connection between the vehicle and a server that is outside of the vehicle;
  transmitting user authentication information from a user of the vehicle to the server, the user authentication information comprising information for a unique identification of the user;
  retrieving a user profile associated with the user authentication information stored in the server;
  acquiring driving environment information of the vehicle in the server;
  executing an application on the server based on the user profile and the acquired driving environment information;
  transmitting output information of the application from the server to the vehicle; and
  changing a driving mode of the vehicle based on the output information received from the server,
  wherein the driving mode includes a sport mode, a storm mode for storm weather, and/or a specific location/time mode for a specific location and/or time of day.

16. A method for a motor vehicle, the method comprising:
  providing a communication connection between the vehicle and a server that is outside of the vehicle;
  transmitting user authentication information from a user of the vehicle to the server, the user authentication information comprising information for a unique identification of the user;
  retrieving a user profile associated with the user authentication information stored in the server;
  acquiring driving environment information of the vehicle in the server;
  executing an application on the server based on the user profile and the acquired driving environment information;
  transmitting output information of the application from the server to the vehicle;
  changing a driving mode of the vehicle based on the output information received from the server;
  determining whether the user authentication information transmitted from the vehicle matches user information stored in the server; and
  if the user authentication information does not match the user information, transmitting preconfigured output information stored in the server to the vehicle.

17. The method according to claim 16, further comprising: transmitting location information of the vehicle to a network.

18. The method according to claim 15, further comprising: notifying a vehicle status to an owner of the vehicle.

19. The method according to claim 4, wherein the application includes a navigation system, a parking assist system, a parking spot locator program, or a speed controller; and
  wherein the configuration data includes data related to seat adjustment, radio station settings, chasing tuning, engine settings, air conditioning settings, maximum speed settings.

20. The method according to claim 4, wherein the user profile further includes vehicle-specific configurations.

* * * * *